Jan. 19, 1960
N. MIRONOFF
2,922,022
DEVICES FOR ADJUSTING THE POSITION OF AN ELECTRODE
OF A MACHINE FOR MACHINING BY ELECTRO-EROSION
Filed March 5, 1958
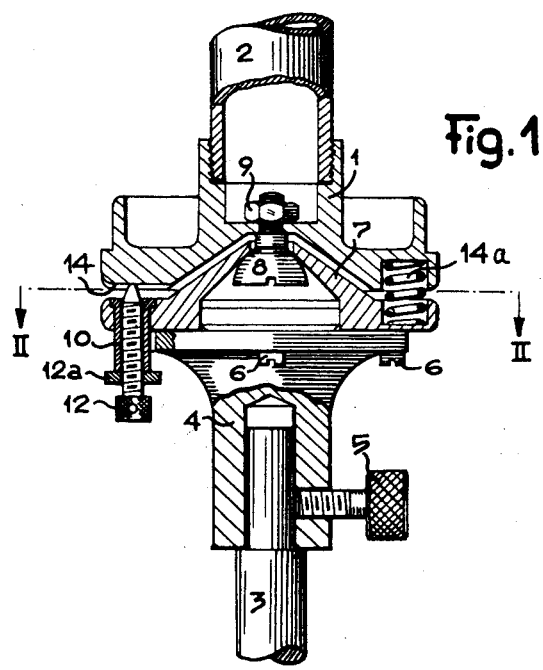
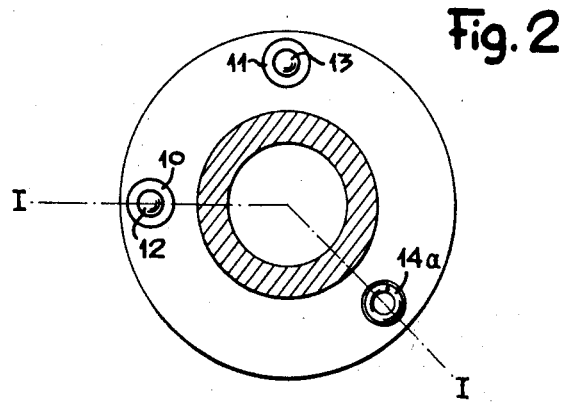

United States Patent Office 2,922,022
Patented Jan. 19, 1960

2,922,022

DEVICES FOR ADJUSTING THE POSITION OF AN ELECTRODE OF A MACHINE FOR MACHINING BY ELECTRO-EROSION

Nicolas Mironoff, Geneva, Switzerland, assignor to Ateliers des Charmilles S.A., Geneva, Switzerland, a corporation of Switzerland Application March 5, 1958, Serial No. 719,331

Claims priority, application Switzerland March 27, 1957

4 Claims. (Cl. 219—69)

In machines for electro-erosion, it is necessary to be able to adjust the position of the electrode relatively to a device for controlling the feed of the electrode. When it is desired to drill relatively deep holes in a part, a satisfactory result can be obtained on condition that the direction of the electrode is rigorously parallel to the axis of feed thereof. When this is not the case it has been found, on the one hand, that the cross-section of the hole does not correspond exactly with that which it is desired to obtain and, on the other hand, the quality of the machining varies from one point to another of the wall of the hole obtained.

Various arrangements are already known which can be used for adjusting the position of an electrode relatively to its feed device. These devices, however, are not always very practical as, in order to obtain an adjustment of great precision, it is necessary to effect a large number of successive corrections, which require a considerable period of time.

The present invention has for its subject a device for adjusting the position of an electrode of a machine for machining by electro-erosion, permitting of obtaining a precise and rapid adjustment of the electrode, by reason of the fact that it is formed by at least two parts hinged one to the other, one of said parts being adapted to carry the electrode, and the other to be fixed to a device for the control of the feed of the electrode, at least one hinge joint and two stops, adjustable by micrometer screws, being provided between said two parts so as to permit of them pivoting one relatively to the other about two axes contained in a plane perpendicular to the direction of movement of the feed device for the electrode, said plane passing through the hinge centre of the joint.

One form of construction of the subject of the invention is shown by way of example in the accompanying drawing, wherein:

Fig. 1 is a vertical section of said device.

Fig. 2 is a horizontal section on the line II—II of Fig. 1.

The device comprises a first part 1 screwed to the end of a tube 2 adapted to slide longitudinally under the action of means not shown, in order to communicate to an electrode 3 the advance movements which are necessary in proportion to the working of the part to be machined. This electrode 3, which may be of copper, for example, has an extremity engaged in a bore of a part 4 and is held in position by means of a screw 5. The part 4 is secured by screws 6 to a truncated part 7. Said latter is connected to the part 1 by means of a hinge joint formed by a ball-swivel 8 which is secured to the part 1 by means of a nut 9. The part 7 carries two sleeves 10 and 11, each having a threaded bore with which engages a screw 12, 13 respectively, of which the end bears against the respective bottom of two radial grooves of the part 1, of which only 14 is visible in Fig. 1. The screws 12 and 13 may be locked in position by means of a lock-nut, only the lock-nut 12a being shown in Fig. 1.

The bearing points of said screws 12 and 13 are located in a plane perpendicular to the axis of movement of the feed device for the electrode, that is to say to the axis of the tube 2, said plane passing through the hinge centre of the ball joint 8.

Finally a spring 14a is provided between the parts 1 and 7, the ends of said spring being engaged in seatings provided on each of said parts. Said spring is located on the side opposite to the bearing points of the screws 12 and 13 relatively to the centre of the ball 8 and, as it operates under compression, it tends to maintain the end of the screws 12 and 13 in contact with the part 1.

The operation of the adjusting device described is very simple as, when acting upon one of the two screws, the part 7 is caused to pivot relatively to the part 1, about an axis passing through the centre of the ball 8, and the bearing point of the other screw. The two screws 12 and 13 are located in such a manner that the axes which they define with the centre of the ball hinge joint 8 are perpendicular to one another. When it is desired to bring the electrode into a position such that its longitudinal axis is rigorously parallel to the axis of movement of its feed device, a first adjustment is effected, for example by means of the screw 12. By acting on said screw it is possible to move the longitudinal axis of the electrode so as to be parallel to a plane perpendicular to the axis passing through the hinge centre and the bearing point of the screw 12. It is possible to control this result easily by applying the pointer of a comparator against the electrode, for example on the side of the screw 12 or on the diametrically opposed side, whilst the electrode is caused to rise or descend by means of the feed device. When this adjustment has been made a second adjustment is effected in an identical manner by acting on the screw 13, which enables the axis of the electrode to be brought into a position in which it is also parallel to a plane perpendicular to the axis passing through the hinge centre and the bearing point of the screw 13. The axis of the electrode is thus exactly parallel to the direction of movement of the feed device.

It should be observed that the part 7 may pivot relatively to the part 1 about two axes orthogonal to one another contained in a plane perpendicular to the direction of movement of the feed device for the electrode, said plane passing through the hinge centre of the joint. It will also be seen that the position of said axes is not modified in any way when acting on one or other of the screws 12 and 13. It thus results that when a first adjustment has been effected by means of the screw 12, the subsequent adjustments which are made by means of the screw 13 have no influence on the first adjustment made by means of the screw 12, thus avoiding the necessity of having to effect successive corrections on each of the adjusting screws, as is the case in known devices. The perpendicularity of the two axes defined by the bearing points of the screws 12 and 13 and the hinge centre is not a necessary condition, as it is possible to effect the adjustment of the position of the electrode exactly in the manner hereinbefore described when the two axes are inclined relatively to one another, but on condition that they are always contained in a plane perpendicular to the direction of movement of the electrode.

It will be understood that modifications may be applied to the device described, and the ball hinge joint 8 may be replaced by any other hinge device, for example by a cardan type joint. According to a particularly simple modification, it is possible to apply only three bearing points between the part carrying the electrode and that secured to the device for controlling the feed, said three points representing three apices of a triangle. The two parts should then be maintained in contact by means of at least one spring operating under traction and hooked to the said parts in such a manner that its line of action passes through the said triangle. One bearing point may be stationary, whilst the other two bearing points are formed by adjusting screws screwed into the part carrying the electrode.

I claim:

1. A device for adjusting the position of an electrode in electro-erosion apparatus, said device comprising an electrode-carrying part and another part to be secured to the electrode-advancing means, said two parts being hinged to each other by a ball joint, said part carrying said electrode having two threaded bores, screws engaging with said bores, said screws bearing at one end against the other said part, the bearing points of said screws being located in a plane perpendicular to the axis of the movement of said device for feeding the electrode and passing through the centre of said hinge joint, said screws being adjustable by micrometer screws and permitting pivotal movement of said parts relatively to each other about two axes contained in said plane, and at least one resilient element being provided for maintaining the extremities of said screws against their respective bearing points.

2. A device according to claim 1, wherein said resilient element is formed by a spring operating under compression and located on the side opposite the bearing points relatively to the centre of said ball.

3. A device for adjusting the position of an electrode in electro-erosion apparatus, said device comprising a first part carrying said electrode, a second part to be secured to the means advancing the electrode, a ball joint hingedly connecting said parts, adjustable stops in said first part bearing against said second part and permitting pivotal movement of said parts with respect to each other about axes extending in a plane perpendicular to the direction of movement of said electrode-advancing means, said plane passing through the centre of said hinge joint, and means forcing said stops resiliently against said second part in said plane.

4. A device as claimed in claim 3 wherein said resilient means is a spring operating under compression and located on the side opposite the bearing points of said stops relatively to the centre of said ball joint.

References Cited in the file of this patent

UNITED STATES PATENTS

| | | |
|---|---|---|
| 2,441,319 | Harding | May 11, 1948 |
| 2,602,308 | Bonnet | July 8, 1952 |
| 2,654,256 | McKechnie | Oct. 6, 1953 |